United States Patent [19]

Müller et al.

[11] Patent Number: 5,741,862

[45] Date of Patent: Apr. 21, 1998

[54] HIGH FLEXIBLE PROPYLENE/ETHYLENE COPOLYMERS AND PROCESS FOR PREPARING SAME

[75] Inventors: Patrik Müller, Kaiserslautern; Meinolf Kersting, Neustadt, both of Germany

[73] Assignee: BASF Aktiengesellschaft, Ludwigshafen, Germany

[21] Appl. No.: 782,085

[22] Filed: Jan. 13, 1997

Related U.S. Application Data

[62] Division of Ser. No. 527,681, Sep. 13, 1995, abandoned.

[51] Int. Cl.$^6$ ............... C08F 297/08; C08F 8/50
[52] U.S. Cl. ............... 525/323; 525/53; 525/247; 525/268; 525/270; 525/322; 525/387; 525/938; 526/73; 526/142
[58] Field of Search ............... 525/387, 53, 247, 525/268, 270, 322, 323, 938; 526/73, 142

[56] References Cited

U.S. PATENT DOCUMENTS

| | | | |
|---|---|---|---|
| 4,061,694 | 12/1977 | Castagna | 525/387 |
| 4,578,430 | 3/1986 | Davison | 525/387 |
| 4,977,210 | 12/1990 | Kerth et al. | 525/53 |
| 5,147,928 | 9/1992 | Kerth et al. | 525/53 |
| 5,262,487 | 11/1993 | Fujita et al. | 525/247 |

FOREIGN PATENT DOCUMENTS

| | | |
|---|---|---|
| 131 268 | 1/1985 | European Pat. Off. . |
| 351 208 | 1/1990 | European Pat. Off. . |
| 461 883 | 12/1991 | European Pat. Off. . |
| 518 093 | 12/1992 | European Pat. Off. . |
| 40 01 157 | 7/1991 | Germany . |
| 84/5261 | 7/1984 | South Africa . |

OTHER PUBLICATIONS

WPI Accession No. 92-417044/51, Dec. 1992.

*Primary Examiner*—Fred Teskin
*Attorney, Agent, or Firm*—Keil & Weinkauf

[57] ABSTRACT

Highly flexible propylene/ethylene copolymers having a high rubber content are obtainable by two-stage polymerization from the gas phase in an agitated fixed bed by means of a Ziegler-Natta catalyst system which, in addition to a titanium-containing solid component, also contains an aluminum compound as a cocatalyst, in a first polymerization stage, propylene being polymerized at from 15 to 40 bar and from 50° to 90° C. and during an average residence time of the reaction mixture of from 0.5 to 5 hours and then, in a second polymerization stage, a mixture of propylene and ethylene being polymerized with the polymer discharged from the first polymerization stage, at from 5 to 30 bar, this pressure being at least 2 bar below the pressure of the first polymerization stage, and at from 60° to 100° C. and during an average residence time of the reaction mixture of from 0.5 to 5 hours, the ratio of the partial pressure of propylene to that of ethylene being brought within the range from 0.5: to 5:1, the weight ratio of the monomers reacted in the first polymerization stage to those reacted in the second polymerization stage being from 0.9:1 to 0.4:1 and the polymerization in the second polymerization stage being carried out in the presence of a $C_1$–$C_8$-alkanol.

3 Claims, No Drawings

HIGH FLEXIBLE PROPYLENE/ETHYLENE COPOLYMERS AND PROCESS FOR PREPARING SAME

This application is a divisional of application Ser. No. 08/527,681, filed on Sep. 13, 1995, now abandoned.

The present invention relates to highly flexible propylene/-ethylene copolymers having a high rubber content, obtainable by two-stage polymerization from the gas phase in an agitated mixed bed by means of a Ziegler-Natta catalyst system which, in addition to a titanium-containing solid component, also contains an aluminum compound as a cocatalyst, wherein, in a first polymerization stage, propylene is polymerized at from 15 to 40 bar and from 50° to 90° C. and during an average residence time of the reaction mixture of from 0.5 to 5 hours and then, in a second polymerization stage, a mixture of propylene and ethylene is polymerized with the polymer discharged from the first polymerization stage, at from 5 to 30 bar, this pressure being at least 2 bar below the pressure of the first polymerization stage, and at from 60° to 100° C. and during an average residence time of the reaction mixture of from 0.5 to 5 hours, the ratio of the partial pressure of propylene to that of ethylene is brought within the range from 0.5:1 to 5:1, the weight ratio of the monomers reacted in the first polymerization stage to those reacted in the second polymerization stage being from 0.9:1 to 0.4:1 and the polymerization in the second polymerization stage being carried out in the presence of a $C_1$–$C_8$-alkanol.

The present invention also relates to a process for the preparation of these propylene/ethylene copolymers and to films, fibers and moldings comprising these copolymers.

Propylene/ethylene copolymers obtainable by polymerization over a Ziegler-Natta catalyst have already been described in a number of patents. U.S. Pat. No. 4,260,710 discloses the preparation of homo- and copolymers of alk-1-enes by polymerization with the aid of Ziegler-Natta catalysts in a stirred kettle. The catalyst components used contain, inter alia, compounds of polyvalent titanium, aluminum halides and/or aluminum alkyls, as well as electron donor compounds, silanes, esters, ethers, ketones or lactones generally being used (EP-B 14 523, EP-B 45 977, EP-B 86 473, EP-A 171 200 and U.S. Pat. No. 4,857,613).

There are also a number of known processes for the preparation of propylene/ethylene block copolymers with the aid of a Ziegler-Natta catalyst system (U.S. Pat. No. 4,454,299, U.S. Pat. No. 4,455,405 and GB-B 1 032 945), in which gaseous propylene is first polymerized in a first reaction stage and the homopolymer obtainable therefrom is then introduced into a second reaction stage, where a mixture of ethylene and propylene is polymerized with it. The process is usually carried out at superatmospheric pressure and in the presence of hydrogen as a molecular weight regulator. The copolymers obtainable generally have excellent impact strength.

The preparation of propylene/ethylene block copolymers with the aid of a Ziegler-Natta catalyst system is also described in EP-A 355 603, EP-A 131 268, and DE-A 4 001 157. There, a propylene homopolymer is first prepared in a first polymerization stage and a mixture of propylene and ethylene is then polymerized therewith in a second polymerization stage. In addition to a high notched impact strength, the polymers obtainable have an advantageous particle size distribution and very low contents of undesirable catalyst residues, in particular of titanium and chlorine. In the case of these polymers, however, a relatively high tendency to stress whitening is often observed, so that these polymers only have limited use for products where the optical properties are important. Stress whitening is understood as meaning the white coloration of the previously transparent sample in the individual regions, which occurs in many plastics during orientation.

In the preparation of propylene/ethylene copolymers by one of the two-stage processes described above, coating of the reactor wall is frequently observed in the second polymerization stage after a few hours. This coating makes it more difficult to control the temperature and reaction during the copolymerization. Consequently, the reactor operating times have to be reduced in order to be able to ensure a controlled reaction procedure in every case. Shorter reactor operating times in turn result in an increase in the set up times and therefore in the production costs, so that coating adversely affects the cost-efficiency of the preparation of such propylene/ethylene copolymers.

DE-A 4 119 345 likewise discloses a two-stage process for the preparation of propylene/ethylene copolymers, in which coating is substantially reduced. The propylene/ethylene copolymers obtained therefrom possess, inter alia, high impact strength in conjunction with a smaller tendency to stress whitening. For some intended uses, however, it is necessary further to improve the already advantageous impact strength and tendency to stress whitening of the copolymers disclosed in DE-A 4 119 345, in order thus to extend the potential uses of such copolymers, for example as flexible films in the automotive sector or as highly flexible covers.

It is an object of the present invention to remedy the disadvantages described and to prepare propylene/ethylene copolymers having a very high impact strength and a greatly reduced tendency to stress whitening, and moreover to suppress the coating which frequently occurs during the preparation of such copolymers.

We have found that this object is achieved by the novel, highly flexible propylene/ethylene copolymers defined at the outset.

The process leading to these copolymers can be carried out in the conventional reactors used for the polymerization of propylene, either batchwise or, preferably, continuously. Suitable reactors include continuously operated stirred kettles, a plurality of stirred kettles connected in series generally being used. The reactors contain a fixed bed of finely divided polymer, which is usually kept in motion by stirring.

The process can be carried out using the Ziegler-Natta catalysts usually employed in polymerization technology. In addition to a titanium-containing solid component, these catalysts also contain, inter alia, a cocatalyst. A suitable cocatalyst is an aluminum compound. An electron donor compound is also preferably used as a further component of the cocatalyst, in addition to this aluminum compound.

For the preparation of the titanium-containing solid component, the titanium compounds used are in general halides or alcoholates of trivalent or tetravalent titanium, the chlorides of titanium, in particular titanium tetrachloride, being preferred. Advantageously, the titanium-containing solid component contains a finely divided carrier, for which silicas and aluminas as well as aluminum silicates have proven useful. Particularly preferably used carriers are silicas and aluminas as well as aluminum silicates of the formula $SiO_2 \cdot aAl_2O_3$, where a is from 0.001 to 2, in particular from 0.001 to 0.5.

Inter alia, compounds of magnesium are also used in the preparation of the titanium-containing solid component. Particularly suitable compounds of this type are magnesium halides, magnesium alkyls and magnesium aryls, as well as alkoxymagnesium and aryloxymagnesium compounds, magnesium dichloride, magnesium dibromide and di-$C_1$-$C_{10}$-alkylmagnesium compounds being preferably used. The titanium-containing solid component may furthermore contain halogen, preferably chlorine or bromine, the halogen preferably being introduced into the titanium-containing solid component in the form of a halogenating agent or in molecular form.

The titanium-containing solid component furthermore contains electron donor compounds, for example mono- or polyfunctional carboxylic acids, carboxylic anhydrides and carboxylic esters, as well as ketones, ethers, alcohols, lactones and organophosphorus and organosilicon compounds. Preferably used electron donor compounds within the titanium-containing solid components are phthalic acid derivatives of the general formula I

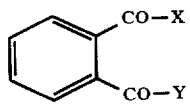

where X and Y are each chlorine or $C_1$-$C_{10}$-alkoxy or together are oxygen. Particularly preferred electron donor compounds are phthalic esters, where X and Y are each $C_1$-$C_8$-alkoxy, for example methoxy, ethoxy, propoxy or butoxy.

Further preferred electron donor compounds within the titanium-containing solid component include diesters of 3-membered or 4-membered, unsubstituted or substituted cycloalkyl-1,2-dicarboxylic acids and monoesters of unsubstituted or substituted benzophenone-2-carboxylic acids. The alcohols usually used in esterification reactions, including $C_1$-$C_{15}$-alkanols, $C_5$-$C_7$-cycloalkanols, which in turn may carry $C_1$-$C_{10}$-alkyl groups, and $C_6$-$C_{10}$-phenols are used as hydroxy compounds in the case of these esters.

The titanium-containing solid component can be prepared by methods known per se. Examples of these are described in, inter alia, EP-A 45 975, EP-A 45 977, EP-A 86 473, EP-A 171 200, GB-A 2 111 066 and U.S. Pat. No. 4 857 613.

In the preparation of the titanium-containing solid component, the following three-stage process is preferably used:

In the first stage, a solution of the magnesium-containing compound in a liquid alkane is first added to a finely divided carrier, preferably silica or an aluminum silicate of the formula $SiO_2 \cdot aAl_2O_3$, where a is from 0.001 to 2, in particular from 0.01 to 0.5, which as a rule has a particle diameter from 0.01 to 1000 μm, in particular from 10 to 300 μm, a pore volume of from 0.1 to 10, in particular from 1.0 to 4.0, cm³/g and a specific surface area from 10 to 1000, in particular from 100 to 500, m²/g, after which this mixture is stirred for from 0.5 to 5 hours at from 10° to 120° C. From 0.1 to 1 mol of the magnesium compound is preferably used per mole of the carrier. Thereafter, a halogen or a hydrogen halide, in particular chlorine or hydrogen chloride, is added with continuous stirring in at least a two-fold, preferably at least a five-fold, molar excess, based on the magnesium-containing compound. After from about 30 to 120 minutes, the solid is separated from the liquid phase.

In the second stage, the product obtained in this manner is introduced into a liquid alkane, after which a $C_1$-$C_8$-alkanol, in particular ethanol, a halide or an alcoholate of trivalent or tetravalent titanium, in particular titanium tetrachloride, and an electron donor compound are added. From 1 to 5, in particular from 2 to 4, mol of alkanol, from 2 to 20, in particular from 4 to 10, mol of the trivalent or tetravalent titanium and from 0.01 to 1, in particular from 0.1 to 1.0, mol of the electron donor compound are used per mole of magnesium of the solid obtained from the first stage. This mixture is stirred for at least one hour at from 10° to 150° C., and the solid substance thus obtained is then filtered off and washed with a liquid alkane, preferably with hexane or heptane.

In the third stage, the solid obtained from the second stage is extracted for a few hours at from 100° to 150° C. with excess titanium tetrachloride or with an excess of a solution of titanium tetrachloride in an inert solvent, preferably an alkyl-benzene, the solvent containing at least 5% by weight of titanium tetrachloride. The product is then washed with a liquid alkane until the titanium tetrachloride content of the wash liquid is less than 2% by weight.

The titanium-containing solid component obtainable in this manner is used with a cocatalyst as the Ziegler-Natta catalyst system. Suitable cocatalysts are aluminum compounds.

Aluminum compounds which are suitable as cocatalysts are trialkylaluminum as well as compounds in which an alkyl group is replaced by an alkoxy group or by a halogen atom, for example by chlorine or bromine. Trialkylaluminum compounds whose alkyl groups are each of 1 to 8 carbon atoms, for example trimethyl-, triethyl- or methyldiethylaluminum, are preferably used.

In addition to the aluminum compound, electron donor compounds, for example mono- or polyfunctional carboxylic acids, carboxylic anhydrides and carboxylic esters, as well as ketones, ethers, alcohols, lactones and organophosphorus and organosilicon compounds, are preferably also used as a further cocatalyst.

Preferred electron donor compounds are organosilicon compounds of the general formula II $$R^1{}_n Si(OR^2)_{4-n}$$ II where the radicals $R^1$ are identical or different and are each $C_1$-$C_{20}$-alkyl, 5-membered to 7-membered cycloalkyl, which in turn may carry a $C_1$-$C_{10}$-alkyl group, or $C_6$-$C_{20}$-aryl or arylalkyl, the radicals $R^2$ are identical or different and are each $C_1$-$C_{20}$-alkyl and n is 1, 2 or 3. Particularly preferred compounds are those in which the radicals $R^1$ are identical or different and are each $C_1$-$C_8$-alkyl or 5-membered to 7-membered cycloalkyl, the radicals $R^2$ are identical or different and are each $C_1$-$C_4$-alkyl and n is 1 or 2.

Among these compounds, dimethoxydiisopropylsilane, dimethoxyisobutylisopropylsilane, dimethoxydiisobutylsilane, dimethoxydicyclopentylsilane, dimethoxyisobutyl-sec-butylsilane, dimethoxyisopropyl-sec-butylsilane and diethoxyisobutylisopropylsilane are particularly noteworthy.

Preferably used catalyst systems are those in which the atomic ratio of aluminum from the aluminum compound to titanium from the titanium-containing solid component is from 10:1 to 800:1, in particular from 20:1 to 200:1, and the molar ratio of the aluminum compound to the electron donor compound used as a cocatalyst is from 1:1 to 100:1, in particular from 2:1 to 80:1.

The polymerization of the propylene is carried out in the first polymerization stage at from 15 to 40 bar and from 50° to 90° C. and during an average residence time of the reaction mixture of from 0.5 to 5 hours. Pressures of from 20 to 35 bar, temperatures of from 60° to 85° C. and average residence times of from 1.0 to 4 hours are preferred. In a preferred procedure, the reaction conditions are chosen so that, in the first polymerization stage, from 0.05 to 2 kg, preferably from 0.1 to 1.5 kg. of polypropylene are formed by mmol of the aluminum component.

This polypropylene is discharged with the catalyst from the first polymerization stage after the end of the reaction and is introduced into the second polymerization stage, where a mixture of propylene and ethylene is polymerized with it. The pressure prevailing in the second polymerization stage is 2. preferably 7. bar below that of the first polymerization stage and is from 5 to 30, preferably from 10 to 25, bar. The average residence time for the polymer is from 0.5 to 5, preferably from 1.0 to 4, hours. In the second polymerization stage, the ratio of the partial pressure of propylene to that of ethylene is from 0.5:1 to 5:1, in particular from 1:1 to 5:1.

According to the invention, the polymerization in the second polymerization stage is carried out at from 60° to 100° C., in particular from 70° to 90° C., and in the presence of a $C_1$–$C_8$-alkanol. A $C_1$–$C_4$-alkanol is preferably used, in particular methanol, ethanol, n-propanol, n-butanol and very particularly isopropanol. The added $C_1$–$C_8$-alkanols influence the activity of the Ziegler-Natta catalyst and reduce the coating on the reactor wall. The amount of added $C_1$–$C_8$-alkanol is advantageously such that the molar ratio of the aluminum compound to the $C_1$–$C_8$-alkanol is from 0.1:1 to 10:1, in particular from 0.2:1 to 5:1.

When carrying out the process leading to the novel propylene/ethylene copolymers, it is also necessary to ensure that the weight ratio of the monomers reacted in the first polymerization stage to those reacted in the second polymerization stage is brought to values of from 0.9:1 to 0.4:1, in particular from 0.8:1 to 0.5:1. This gives propylene/ethylene copolymers which possess, inter alia, a high rubber content, i.e. a high proportion of xylene-soluble propylene/ethylene copolymers.

In a further embodiment of the process leading to the novel propylene/ethylene copolymers, polymerization in the second polymerization stage is effected in the presence of an aluminum compound which is additionally introduced and serves as a cocatalyst.

For this purpose, the aluminum compound is metered into the second polymerization stage before or during the polymerization. Suitable aluminum compounds in addition to trialkylaluminum are those compounds in which an alkyl group has been replaced by an alkoxy group or by a halogen atom, for example by chlorine or bromine. Preferably used trialkylaluminum compounds are those whose alkyl groups are each of 1 to 8 carbon atoms, for example trimethyl-, triethyl or methyldiethylaluminum. In this special embodiment of the process leading to the novel propylene/ethylene copolymers, the aluminum compound is usually introduced into the second polymerization stage in amounts such that the weight ratio of the aluminum compound present in the first polymerization stage to that present in the second polymerization stage is from 5:1 to 0.5:1, in particular from 3:1 to 1:1.

It is also possible for the titanium-containing solid component which is effective as a catalyst also to be introduced into the second polymerization stage, in addition to the aluminum compound. Said titanium-containing solid component, which has already been described in detail in connection with the description of the catalyst system, may be introduced into the second polymerization stage both before and during the polymerization, as in the case of the aluminum compound. The weight ratio of the titanium-containing solid component present in the first polymerization stage to that present in the second polymerization stage is usually brought to 5:1 to 0.5:1, in particular 3:1 to 1:1.

The molecular weight of the novel propylene/ethylene copolymer can be controlled in the usual manner by adding regulators, in particular hydrogen.

It is also possible to reduce the molecular weight of the novel propylene/ethylene copolymers by means of a peroxide after discharge from the second polymerization stage. This reduction in the molecular weight may be effected in a conventional mixing apparatus, for example a kneader, roll mill, mixer or extruder, the last-mentioned apparatus being preferably used. Twin-screw extruders are particularly preferred.

The molecular weight reduction by means of a peroxide is usually carried out at from 170° to 300° C., in particular from 200° to 250° C. and from 3 to 30, in particular from 5 to 25, bar and during average residence times of from 0.3 to 5, in particular from 0.5 to 2, minutes.

The reduction in the molecular weight by means of the peroxide is preferably carried out by metering a peroxide compound, either in the form of a solution in an inert solvent, for example in n-hexane, or in the form of a peroxide batch, ie. as a mixture of a peroxide compound with a polyolefin, in particular with a propylene homo- or copolymer, into the feed of the extruder into which the novel propylene/ethylene copolymer is also fed whose molecular weight is to be reduced, and then effecting the reduction in the molecular weight under the abovementioned conditions by means of the peroxide. Said molecular weight reduction is preferably carried out to a melt flow index of at least 0.5 g/10 min at 230° C. and under a weight of 2.16 kg, according to DIN 53 735.

Preferably used peroxide compounds are organic peroxides which have half lives of from 1 to 30 seconds at 210° C. Among these compounds, dicumyl peroxide, monocumyl tert-butyl peroxide, di-tert-butyl peroxide, 2,5-dimethyl-2, 5-di-(tert-butylperoxy)hexane, 2,5-dimethyl-2,5-di-tert-butyl peroxide and 2,5-dimethyl-2,5-di-(tert-butylperoxy) hex-3-yne are particularly noteworthy. Such peroxide compounds are commercially available.

The peroxide compound is preferably used in an amount of from 0.0001 to 1.0, in particular from 0.001 to 0.5, part by weight, based on 100 parts by weight of the novel propylene/ethylene copolymer.

The novel highly flexible propylene/ethylene copolymers have weight average molecular weights of from 10.000 to 1,000,000 and melt flow indices (HLMI) of from 0.1 to 100, preferably from 0.2 to 50, g/10 min, measured in each case according to DIN 53 735 at 230° C. and 21.6 kg. The melt flow index (HLMI) corresponds in this case to the amount of polymer which is forced in the course of 10 minutes, at 230° C. and under a weight of 21.6 kg, out of the test apparatus standardized according to DIN 53 735. In addition to a very good notched impact strength, the novel highly flexible propylene/ethylene copolymers also have, in particular, much less tendency to stress whitening than the conventional propylene/ethylene copolymers. In the preparation of the novel highly flexible propylene/ethylene copolymers, the formation of coatings in the second polymerization stage is much less pronounced, so that the process can be carried out in a trouble-free manner for considerably longer. The rigidity of the novel highly flexible propylene/ethylene copolymers is preferably less than 210, in particular less than 130, $N/nm^2$ (G modulus).

Owing to their good mechanical and optical properties, such highly flexible copolymers are particularly suitable for the production of films, fibers and moldings.

EXAMPLE 1

The novel, highly flexible propylene/ethylene copolymers were prepared in two stirred autoclaves connected in series and each having an effective volume of 180 l, in the presence of hydrogen as a molecular weight regulator. Both reactors contained an agitated fixed bed of finely divided polypropylene.

Gaseous propylene was introduced into the first polymerization reactor at 27 bar and 70° C. and was polymerized continuously with the aid of a Ziegler-Natta catalyst. 1 g/h of a titanium-containing solid component, 60 mmol/h of triethylaluminum and 6 mmol/h of dimethoxyisobutylisopropylsilane were used as catalyst components. The average residence time of the reaction mixture was 2 hours. In this process, 0.4 kg of polypropylene was produced per mmol of the aluminum compound. Titanium-containing solid component was prepared by the following process.

For this purpose, butyloctylmagnesiumdissolved in n-heptane was added, in a first stage, to $SiO_2$ which had a particle diameter from 20 to 45 µm, a pore volume of 1.75 $cm^3/g$ and a specific surface area of 320 $m^2/g$. 0.3 mol of the magnesium compound being used per mole of $SiO_2$. The solution was stirred for 1.5 hours at 90° C. and then cooled to 20° C., after which 10 times the molar amount, based on the organomagnesium compound, of hydrogen chloride was passed in. After 30 minutes, the solid-phase product was separated from the solvent.

n-Heptane was added to the product obtainable from the first stage, and 3 mol of ethanol per mole of magnesium were then added with continuous stirring. This mixture was stirred for 1.5 hours at 80° C., and 6 mol of titanium tetrachloride and 0.5 mol of di-n-butyl phthalate, based in each case on 1 mol of magnesium, were then added. The reaction mixture was stirred for a further two hours, after which the solid was separated from the solvent by filtration.

The product thus obtained was extracted for two hours at 125° C. with a 15% strength by weight solution of titanium tetrachloride in ethylbenzene.

The solid product was then separated from the extracting medium by filtration and was washed with n-heptane until the latter contained only 0.3% by weight of titanium tetrachloride.

The resulting titanium-containing solid component contained 3.1% by weight of titanium, 7.5% by weight of magnesium and 28.3% by weight of chlorine.

The polypropylene formed in the first reactor was transferred, together with the catalyst, into the second stirred autoclave, where a mixture of propylene and ethylene was polymerized with the polymer at a total pressure of 20 bar and at 70° C. and during an average residence time of 2 hours in the presence of 44 mmol of isopropanol. The ratio of the partial pressure of propylene to that of ethylene was 2.33. The weight ratio of the polypropylene formed in the first reactor to the copolymer formed in the second reactor was 0.72. In the polymerization in the second reactor, 0.73 mmol of isopropanol was used per mmol of the aluminum component. All the reaction parameters are shown in Table 1 below.

A propylene/ethylene copolymer having a melt flow index (HLMI) of 32 g/10 min at 230° C. and 21.6 kg (according to DIN 53 735) was obtained. The mechanical and optical properties of the resulting highly flexible propylene/ethylene copolymers are shown in Table 2 below.

EXAMPLE 2 TO 7

Propylene and ethylene were polymerized with the aid of a Ziegler-Natta catalyst system similarly to Example 1, except that the parameters pressure, temperature, amounts of catalyst components, of monomers and of isopropanol and the weight ratio of the monomers reacted in the first polymerization stage to those reacted in the second polymerization stage were changed, in accordance with Table 1.

In Example 4, the propylene/ethylene copolymer obtained was also subjected, after its preparation, to a molecular weight reduction by means of a peroxide in a twin-screw extruder (ZSK 40) having screws rotating in the same direction, from Werner & Pfleiderer. From 790 to 810 g/hour of a 3% strength by weight peroxide batch (3% by weight of 2,5-dimethyl-2,5-di-(tert-butyl peroxy)hexane and 97% by weight of a coarse-particle propylene homopolymer having a melt flow index of 20 g/10 min at 230° C. and 21.6 kg according to DIN 53 735) were added to the propylene/ethylene copolymer at a throughput of 17 kg/hour, and said copolymers were subjected to a molecular weight reduction by means of a peroxide at 220° C. to a melt flow index (MFI) of 2.2 g/10 min at 230° C. and 2.16 kg according to DIN 53 735.

In Example 5, the molecular weight reduction by means of a peroxide was carried out similarly to Example 4 but at a copolymer throughput of 12.5 kg/hour and with a 5% strength by weight peroxide batch (5% by weight of 2,5-dimethyl-2,5-di-(tert-butyl peroxy)hexane and 95% by weight of the coarse-particle propylene homopolymer used in Example 4).

The properties of the highly flexible propylene/ethylene copolymers obtained are shown in Table 2 below.

TABLE 1

| | Reaction parameter | | | | | | |
|---|---|---|---|---|---|---|---|
| | Examples | | | | | | |
| Polymerization stage 1 | 1 | 2 | 3 | 4 | 5 | 6 | 7 |
| titanium-containing solid component [g/h] | 1.14 | 1.14 | 1.63 | 1.63 | 1.63 | 1.49 | 1.49 |
| Aluminum compound [mmol/h] | 60 | 60 | 60 | 60 | 60 | 60 | 60 |
| Dimethoxyisobutylisopropylsilane [mmol/h] | 6 | 6 | 6 | 6 | 6 | 1.2 | 1.2 |
| Pressure [bar] | 27 | 27 | 24 | 24 | 24 | 24 | 24 |
| Temperature [°C.] | 70 | 70 | 60 | 60 | 60 | 60 | 60 |
| Polymerization stage 1 Polymerization stage 2 | | | | | | | |
| Isopropanol [mmol/h] | 17 | 17 | 17 | 17 | 17 | 17 | 44 |
| Pressure [bar] | 20 | 20 | 17 | 17 | 17 | 17 | 17 |
| Temperature [°C.] | 70 | 80 | 80 | 80 | 80 | 80 | 80 |
| Partial pressure ratio Propylene:ethylene | 2.33 | 2.33 | 2.33 | 2.33 | 2.33 | 2.33 | 2.33 |
| Weight ratio of converted monomers in the first stage: converted monomers in the second stage | 0.72 | 0.69 | 0.72 | 0.72 | 0.72 | 0.62 | 0.64 |

TABLE 2

Properties of the copolymers obtained

| | Examples | | | | | | |
|---|---|---|---|---|---|---|---|
| Polymerization stage 1 | 1 | 2 | 3 | 4 | 5 | 6 | 7 |
| Melt flow index<sup>a</sup> [g/10 min] | 32 | 28 | 20 | 2.2* | 9.5* | 32 | 23 |
| Rigidity (G modulus)<sup>b</sup> [N/mm²] | 120 | 120 | 77 | 63 | 44 | 98 | 85 |
| Notched impact strength<sup>c</sup> [kJ/m²] | No fracture | No fracture | No fracture | No fracture | No fracture | No fracture | No fracture |
| Stress whitening<sup>d</sup> [mm] | 0.0 | 0.0 | 0.0 | 0.0 | 0.0 | 0.0 | 0.0 |
| Operating time without coating<sup>e</sup> [h] | >8 | >8 | >8 | >8 | >8 | >8 | >8 |

<sup>a</sup>HLMI, according to DIN 53 735, at 230° C. and under a weight of 2.16 kg
*MFI, according to DIN 53 735, at 230° C. and under a weight of 2.16 kg
<sup>b</sup>according to DIN 53 445
<sup>c</sup>according to DIN 53 453, at −40° C.
<sup>d</sup>at 60° C., description follows below
<sup>e</sup>Operating time without coating, in hours Determination of stress whitening The stress whitening was determined with the aid of a falling bolt apparatus according to DIN 53 443, part 1, a falling bolt having a mass of 250 g, an impact body of 5 mm diameter and a cap radius of 25 mm being used. The height of fall was 50 cm.

The test specimen used was an injection molded circular disk having a diameter of 60 mm and a thickness of 2 mm. The test specimen was injection molded at a melt temperature of 250° C. and a mold surface temperature of 30° C.

The test was carried out at 60° C., each test specimen being subjected to only one impact test. The test specimen was first placed on a support ring without the latter being clamped, and the falling bolt was then released. 5 test specimens were tested in each case to give a mean value.

The diameter of the visible stress whitening mark is stated in mm and was determined by measuring it on that side of the circular disk which is opposite to the impact, in the direction of flow and at right angles thereto, and determining the mean of the two values.

The novel highly flexible propylene/ethylene copolymers have in particular a very high notched impact strength and a substantially smaller tendency to stress whitening.

We claim:

1. A propylene/ethylene copolymer having a high rubber content obtained from a two-stage polymerization process from the gas phase in an agitated solid bed by means of a Ziegler-Natta catalyst system containing a titanium-containing solid component and an aluminum compound cocatalyst, which process comprises, polymerizing propylene in a first polymerization stage at a pressure of from 15 to 24 bar and at a temperature of from 50° to 60° C. and for an average residence time of from 0.5 to 5 hours and subsequently in a second polymerization stage adding a mixture of propylene and ethylene by polymerization to the polymer removed from the first polymerization stage at a pressure of from 5 to 30 bar, this pressure being at least 2 bar below the pressure in the first polymerization stage, at a temperature of from 60° to 100° C., and for an average residence time of from 0.5 to 5 hours; while the ratio of the partial pressure of propylene to that of ethylene is adjusted to from 0.5:1 to 5:1; the weight ratio of the monomers reacted in the first polymerization stage to those reacted in the second polymerization stage is adjusted to from 0.9:1 to 0.4:1; the polymerization in the second polymerization stage is carried out in the presence of a $C_1$–$C_8$-alkanol and no additional aluminum compound cocatalyst and no additional titanium-containing solid catalyst component is introduced to the polymerization in the second polymerization stage and then subjecting the copolymer removed from the second polymerization stage to molecular weight reduction by means of a peroxide.

2. A propylene/ethylene copolymer as claimed in claim 1, wherein the molecular weight reduction by means of a peroxide is carried out in an extruder at from 170° to 300° C.

3. A process for preparing a propylene/ethylene copolymer having a high rubber content, by a two-stage polymerization process from the gas phase in an agitated solid bed by means of a Ziegler-Natta catalyst system comprising a titanium-containing solid component and an aluminum compound cocatalyst which process comprises polymerizing propylene in a first polymerization stage at from 15 to 24 bar and from 50° to 60° C. and for an average residence time of from 0.5 to 5 hours; and subsequently in a second polymerization stage adding a mixture of ethylene and propylene by polymerization to the polymer removed from the first polymerization stage, at a pressure of from 5 to 30 bar, this pressure being at least 2 bar below the pressure of the first polymerization stage, at a temperature of from 60° to 100° C. and for an average residence time of from 0.5 to 5 hours, while the ratio of the partial pressure of propylene to that of ethylene is adjusted to from 0.5:1 to 5:1, the weight ratio of the monomers reacted in the first polymerization stage to those reacted in the second polymerization stage is adjusted to from 0.9:1 to 0.4:1, the polymerization in the second polymerization stage is carried out in the presence of a $C_1$–$C_8$-alkanol and no additional aluminum compound cocatalyst and no additional titanium-containing solid catalyst component is introduced to the polymerization in the second polymerization stage; and then subjecting the copolymer removed from the second polymerization stage to molecular weight reduction by means of a peroxide.

* * * * *

UNITED STATES PATENT AND TRADEMARK OFFICE
CERTIFICATE OF CORRECTION

PATENT NO.: 5,741,862

DATED: April 21, 1998

INVENTOR(S): MUELLER et al.

It is certified that error appears in the above-identified patent and that said Letters Patent is hereby corrected as shown below:

Title page, insert the foreign application priority data as follows:

--[30]    Foreign Application Priority Data
Sep. 15, 1994    [DE]    Germany ................. P 44 32 798.6--.

Signed and Sealed this

Eleventh Day of August 1998

Attest:

BRUCE LEHMAN

*Attesting Officer*        *Commissioner of Patents and Trademarks*